United States Patent
Steele et al.

(10) Patent No.: US 8,910,390 B2
(45) Date of Patent: Dec. 16, 2014

(54) LEVEL

(71) Applicant: Milwaukee Electric Tool Corporation, Brookfield, WI (US)

(72) Inventors: Michael S. Steele, Waukesha, WI (US); Wade F. Burch, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 244 days.

(21) Appl. No.: 13/649,637

(22) Filed: Oct. 11, 2012

(65) Prior Publication Data

US 2013/0091717 A1    Apr. 18, 2013

Related U.S. Application Data

(60) Provisional application No. 61/547,229, filed on Oct. 14, 2011.

(51) Int. Cl.
*G01C 9/18* (2006.01)
*G01C 9/28* (2006.01)
*G01C 9/34* (2006.01)

(52) U.S. Cl.
CPC .. *G01C 9/28* (2013.01); *G01C 9/18* (2013.01); *G01C 9/34* (2013.01)
USPC ............................................. 33/347; 33/371

(58) Field of Classification Search
CPC .............. G01C 9/28; G01C 9/00; G01C 9/02; G01C 9/16; G01C 9/18; G01C 9/24; G01C 9/26
USPC ............................. 33/347, 382, 370, 371, 376
See application file for complete search history.

(56) References Cited

U.S. PATENT DOCUMENTS

| 232,982 A | 10/1880 | Langdon |
| 675,464 A | 6/1901 | Carlson |
| 730,790 A | 6/1903 | Newman |

(Continued)

FOREIGN PATENT DOCUMENTS

| EP | 1225671 | 7/2002 |
| EP | 2056065 | 5/2009 |
| GB | 2364950 | 2/2002 |

OTHER PUBLICATIONS

"Greenlee Enhances its line of Levels with the new L107 Electrician's Torpedo Level," Press Release, Greenlee, Dec. 2005, 1 page.

*Primary Examiner* — Christopher Fulton
(74) *Attorney, Agent, or Firm* — Michael Best & Friedrich LLP

(57) ABSTRACT

A level for indicating the orientation of a surface includes a first planar surface, a second planar surface, a web coupled to the first planar surface and the second planar surface such that the first planar surface is spaced apart from and is parallel to the second planar surface, and a vial having a long axis and containing a liquid and a gas bubble. The level also includes a first magnet coupled to the first planar surface, a second magnet coupled to the first planar surface and spaced apart from the first magnet by a first distance, and a third magnet coupled to the first planar surface and spaced apart from the second magnet by a second distance that is different than the first distance. The first, second, and third magnets are positioned along the first planar surface successively without any additional magnets positioned therebetween.

20 Claims, 11 Drawing Sheets

(56) References Cited

U.S. PATENT DOCUMENTS

| | | | |
|---|---|---|---|
| 2,535,791 A | 12/1950 | Fluke | |
| 2,634,509 A | 4/1953 | Roberts | |
| 2,695,949 A | 11/1954 | Ashwill | |
| 2,789,363 A | 4/1957 | Miley | |
| 2,939,947 A * | 6/1960 | Schultz | 33/348.2 |
| 3,116,563 A | 1/1964 | Gelbman | |
| 3,213,545 A * | 10/1965 | Wright | 33/347 |
| 3,279,080 A | 10/1966 | Stepshinski | |
| 3,832,782 A | 9/1974 | Johnson et al. | |
| 4,099,331 A | 7/1978 | Peterson et al. | |
| 4,126,944 A | 11/1978 | Burkhart | |
| D261,369 S | 10/1981 | Smith | |
| 4,338,725 A | 7/1982 | Martin et al. | |
| 4,407,075 A | 10/1983 | MacDermott et al. | |
| 4,593,475 A | 6/1986 | Mayes | |
| 4,793,069 A | 12/1988 | McDowell | |
| D301,553 S | 6/1989 | Makofsky et al. | |
| 4,888,880 A | 12/1989 | Parker | |
| 5,199,177 A | 4/1993 | Hutchins et al. | |
| D337,279 S | 7/1993 | Styles et al. | |
| 5,505,001 A | 4/1996 | Schaver, Jr. | |
| 5,535,523 A | 7/1996 | Endris | |
| 5,749,152 A | 5/1998 | Goss et al. | |
| 5,755,037 A | 5/1998 | Stevens | |
| 5,813,130 A | 9/1998 | MacDowell | |
| 6,003,234 A | 12/1999 | Seibert | |
| 6,029,360 A | 2/2000 | Koch | |
| 6,070,336 A | 6/2000 | Rodgers | |
| 6,173,502 B1 | 1/2001 | Scarborough | |
| 6,568,095 B2 | 5/2003 | Snyder | |
| 6,675,490 B1 | 1/2004 | Krehel et al. | |
| 6,732,441 B2 | 5/2004 | Charay et al. | |
| 6,782,628 B2 | 8/2004 | Liao | |
| 6,818,824 B1 | 11/2004 | Marcou et al. | |
| 6,839,973 B1 | 1/2005 | Woodward | |
| 7,028,413 B2 * | 4/2006 | Filipescu | 33/528 |
| 7,089,676 B2 | 8/2006 | Godinez | |
| 7,152,335 B2 | 12/2006 | Nichols | |
| 7,204,029 B2 | 4/2007 | Tran et al. | |
| 7,316,074 B2 | 1/2008 | Tran et al. | |
| 7,343,692 B2 | 3/2008 | Gould | |
| 7,363,719 B2 | 4/2008 | Levinson et al. | |
| 7,392,594 B2 | 7/2008 | Kesler | |
| 7,398,600 B2 | 7/2008 | Ming | |
| 7,467,475 B1 | 12/2008 | Cheek | |
| 7,472,486 B2 | 1/2009 | Tran et al. | |
| 7,520,065 B2 | 4/2009 | Vernola | |
| 7,536,798 B2 | 5/2009 | Silberberg | |
| 7,552,540 B2 | 6/2009 | Ming | |
| D598,308 S | 8/2009 | Gofer | |
| D598,309 S | 8/2009 | Gofer | |
| 7,568,292 B2 | 8/2009 | Maruyama | |
| 7,644,506 B2 | 1/2010 | Wong | |
| D613,194 S | 4/2010 | Silberberg | |
| 7,735,229 B2 | 6/2010 | Allemand | |
| 7,802,371 B2 | 9/2010 | Ming | |
| 7,827,699 B2 | 11/2010 | Montgomery | |
| D628,914 S | 12/2010 | Kim et al. | |
| D634,221 S | 3/2011 | Wojciechowski et al. | |
| 7,946,045 B2 | 5/2011 | Allemand | |
| 8,011,108 B2 | 9/2011 | Upthegrove | |
| D646,595 S | 10/2011 | Allemand | |
| 8,061,051 B2 | 11/2011 | Allemand | |
| 8,109,005 B2 | 2/2012 | Hudson et al. | |
| 8,336,221 B2 * | 12/2012 | Steele et al. | 33/528 |
| 8,631,584 B2 * | 1/2014 | Steele et al. | 33/528 |
| 2003/0005590 A1 | 1/2003 | Snyder | |
| 2006/0283031 A1 | 12/2006 | Ming | |
| 2007/0028472 A1 | 2/2007 | Brown | |
| 2007/0113413 A1 * | 5/2007 | Feliciano | 33/374 |
| 2007/0113414 A1 | 5/2007 | Levinson et al. | |
| 2007/0175056 A1 | 8/2007 | Tran et al. | |
| 2008/0022543 A1 | 1/2008 | Kesler | |
| 2008/0222907 A1 | 9/2008 | Silberberg | |
| 2008/0271331 A1 | 11/2008 | Allemand | |
| 2008/0282562 A1 | 11/2008 | Allemand | |
| 2008/0301957 A1 | 12/2008 | Vernola | |
| 2009/0013545 A1 | 1/2009 | Cheek | |
| 2010/0005671 A1 | 1/2010 | Hudson et al. | |
| 2010/0095543 A1 | 4/2010 | Inthavong | |
| 2010/0205814 A1 | 8/2010 | Allemand | |
| 2011/0099823 A1 | 5/2011 | Christianson et al. | |
| 2011/0099824 A1 | 5/2011 | Christianson et al. | |
| 2011/0119941 A1 | 5/2011 | Steele et al. | |
| 2011/0265338 A1 | 11/2011 | Christianson et al. | |
| 2014/0007438 A1 * | 1/2014 | Silberberg | 33/371 |

\* cited by examiner

US 8,910,390 B2

LEVEL

CROSS REFERENCE TO RELATED APPLICATIONS

This application claims priority to U.S. Provisional Patent Application No. 61/547,229, filed Oct. 14, 2011, the entire contents of which are incorporated by reference herein.

This application is also a continuation-in-part of U.S. patent application Ser. No. 12/912,443, filed Oct. 26, 2010, now U.S. Pat. No. 8,336,221 which claims priority to U.S. Provisional Patent Application No. 61/330,773, filed May 3, 2010, and to U.S. Provisional Patent Application No. 61/255,357, filed Oct. 27, 2009, the entire contents of all of which are incorporated by reference herein.

FIELD OF THE INVENTION

The present invention relates to hand tools used to level a surface.

SUMMARY

In one embodiment, the invention provides a level for indicating the orientation of a surface. The level includes a first planar surface, a second planar surface, a web coupled to the first planar surface and the second planar surface such that the first planar surface is spaced apart from and is parallel to the second planar surface, and a vial having a long axis and containing a liquid and a gas bubble. The vial is coupled to the web. The level also includes a first magnet coupled to the first planar surface, a second magnet coupled to the first planar surface and spaced apart from the first magnet by a first distance, and a third magnet coupled to the first planar surface and spaced apart from the second magnet by a second distance that is different than the first distance. The first, second, and third magnets are positioned along the first planar surface successively without any additional magnets positioned therebetween.

In another embodiment, the invention provides a level for indicating the orientation of a surface. The level includes a first planar surface, a second planar surface, a web coupled to the first planar surface and the second planar surface such that the first planar surface is spaced apart from and is parallel to the second planar surface, and a vial having a long axis and containing a liquid and a gas bubble. The vial is coupled to the web. The level also includes a first magnet coupled to the first planar surface, a second magnet coupled to the first planar surface and spaced apart from the first magnet by a first distance, a third magnet coupled to the first planar surface and spaced apart from the second magnet by a second distance that is different than the first distance, and a fourth magnet coupled to the first planar surface and spaced apart from the third magnet by a third distance that is different than both the first distance and the second distance.

Other features and aspects of the invention will become apparent by consideration of the following detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting.

DETAILED DESCRIPTION

FIGS. 1-6 illustrate a level 100 for determining whether an object is level to a particular surface or adjusting an object to a level surface. The level 100 may be used to measure and level at different angles, i.e., 0 degrees, 30 degrees, 45 degrees, and 90 degrees. It should be readily apparent that the level may be used by a variety of users and skilled technicians to perform a variety of leveling functions.

Figure 1:
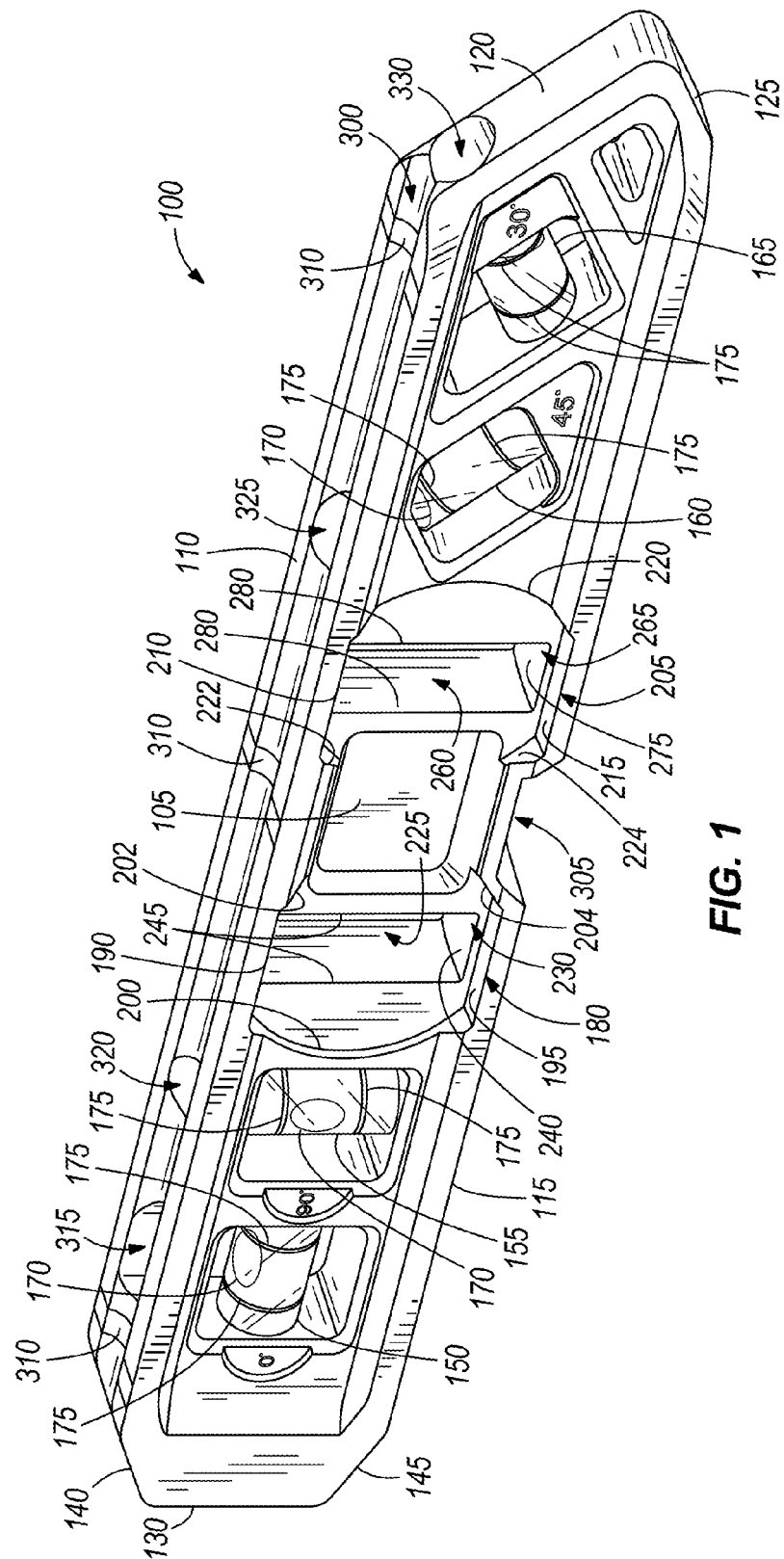
FIG. 1 is a perspective view of a level according to a construction of the invention.
Figure 2:
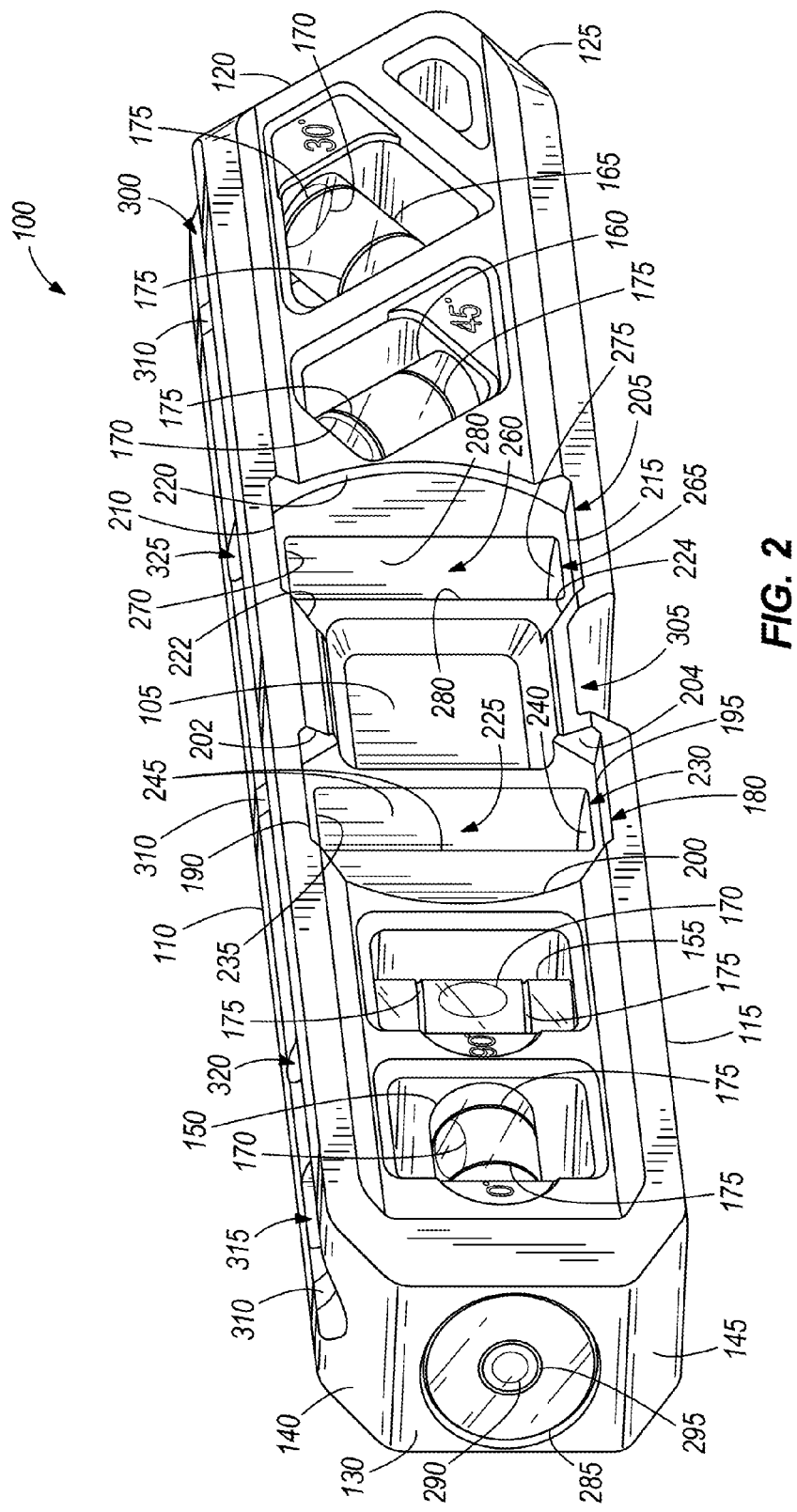
FIG. 2 is another perspective view of the level of FIG. 1.
Figure 3:
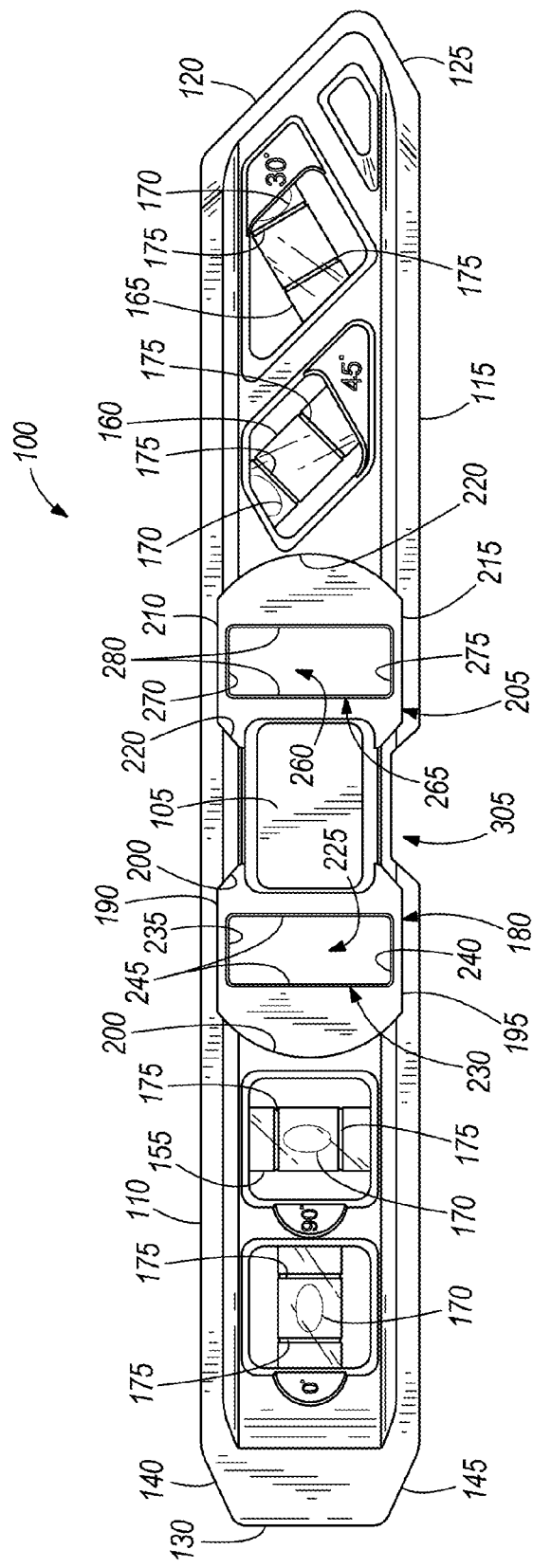
FIG. 3 is a side view of the level shown in FIG. 1.
Figure 4:
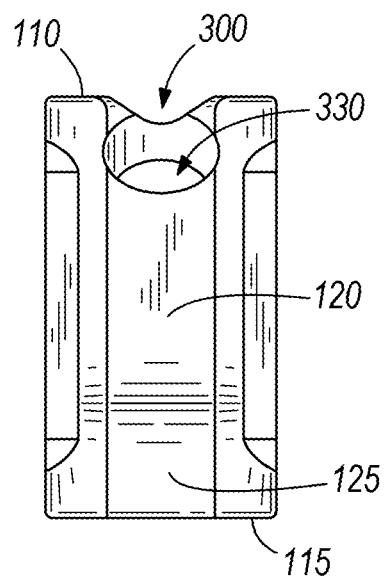
FIG. 4 is a front view of the level shown in FIG. 1.

As shown in FIGS. 1-3, the level 100 includes a web 105 coupled to each of a top planar surface 110, a bottom planar surface 115, a 45-degree planar surface 120, a 30-degree planar surface 125, and a back planar surface 130. The top planar surface 110 is spaced apart from and substantially parallel to the bottom planar surface 115. The 45-degree planar surface 120 is disposed at an included angle of 135 degrees relative to the top planar surface 110. The 30-degree planar surface 125 is disposed at an included angle of 150 degrees relative to the bottom planar surface 115. The back planar surface 130 is substantially perpendicular to the top planar surface 110 and the bottom planar surface 115. The back planar surface 130 is connected to the top planar surface 110 by a first connecting surface 140 and is connected to the bottom planar surface 115 by a second connecting surface 145. The first connecting surface 140 is disposed at an included angle of 135 degrees relative to the top planar surface 110. The second connecting surface 145 is disposed at an included angle of 135 degrees relative to the bottom planar surface 115. Additionally, any of the planar surfaces can include ruler markings for measuring distance.

The web 105 supports a 0-degree vial 150, a 90-degree vial 155, a 45-degree vial 160, and a 30-degree vial 165. The long axis of the 0-degree vial 150 is parallel with the top planar surface 110 and the bottom planar surface 115. The long axis of the 90-degree vial 155 is parallel with the back planar surface 130. The long axis of the 45-degree vial 160 is parallel with the 45-degree planar surface 120. The long axis of the 30-degree vial 165 is parallel with the 30-degree planar surface 125. Each vial contains a liquid, a gas bubble 170, and a series of markings 175. The vials are secured to the web 105 by threaded set screws or other means that hold the vials in place. The threaded set screws inhibit the loosening of the vials over time and also allow for easy replacement of damaged vials. Preferably, the markings 175 are laser etched on the vial and the liquid is colored (e.g., green). Laser-etched markings 175 resist wearing off over time, while the colored liquid improves the visibility of the gas bubble 170 and the markings 175.

As the angle of the level 100 (and therefore the angle of the vial) changes relative to a fixed axis, the gas bubble 170 moves within the vial along the long axis of the vial. Each vial can be used with at least one of the planar surfaces to determine the orientation of a surface or object to be leveled relative to level (i.e., the fixed axis). The position of the gas bubble 170 with respect to the markings 175 allows the user to determine the orientation of the surface or object to be leveled relative to that vial. For example, when the top planar surface 110 engages the surface or object to be leveled, the surface or object to be leveled is level when the gas bubble is centered along the long axis of the 0-degree vial 150.

Figure 7:
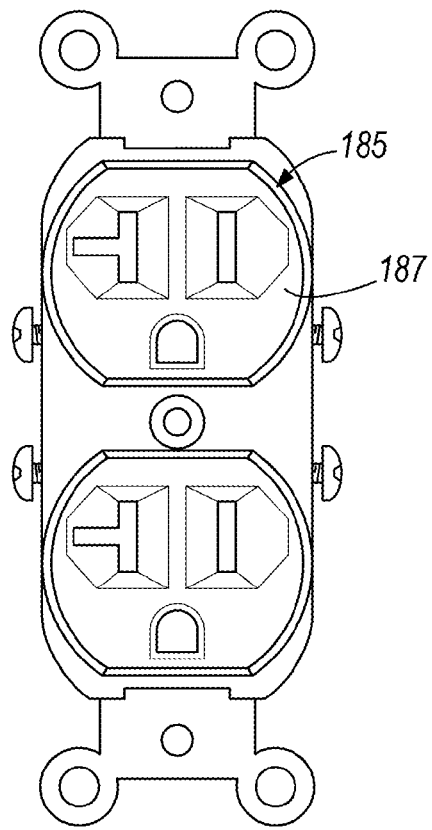
FIG. 7 is a front view of an electrical outlet.

As best shown in FIG. 3, a first electrical outlet perimeter 180 is formed in the web 105. The perimeter 180 is shaped like the perimeter 185 of a standard (120 volt AC) electrical outlet 187 (e.g., a NEMA 5-15 receptacle), as shown in FIG. 7. The perimeter 180 includes a top portion 190, a bottom portion 195, a first curved side portion 200, and a second curved side portion divided into two segments 202 and 204. The perimeter 180 is sized to engage at least a portion of the perimeter 185 of the electrical outlet 187 when the electrical outlet 187 is inserted within the perimeter 180. When the perimeters 180, 185 are engaged, either the 0-degree vial 150 or the 90-degree vial 155 is used to level the electrical outlet 187. Alternatively, the perimeter 180 is configured to accommodate the leveling of differently shaped electrical outlets, for example, those configured for use with different voltages or for use in other countries. The perimeter 180 allows the user to level the electrical outlet 187 without attaching a face plate to the electrical outlet 187.

Figure 6:
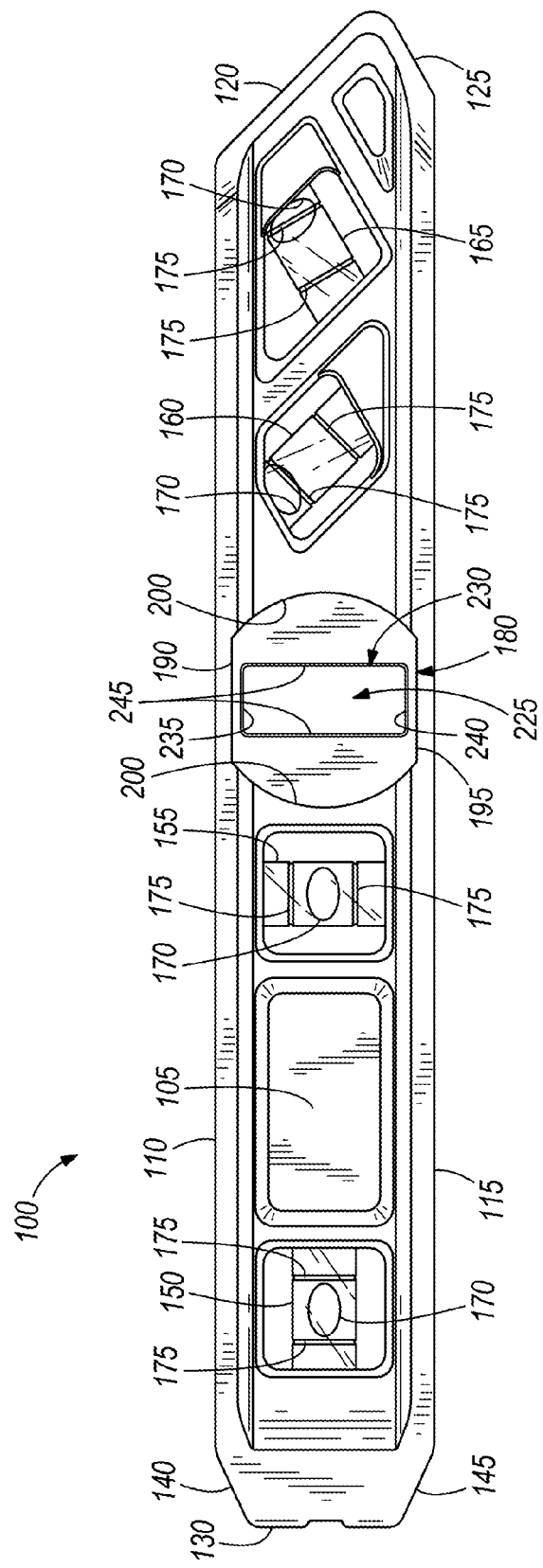
FIG. 6 is a side view of an alternative of the level shown in FIG. 1.

A second electrical outlet perimeter 205, identical to the first perimeter 180, is formed in the web 105. The second perimeter 205 includes a top portion 210, a bottom portion 215, a first curved side portion 220, and a second curved side portion divided into two segments 222 and 224. The second perimeter 205 is spaced from the first perimeter 180 so that the two perimeters 180, 205 are separated by the standard spacing between a pair of side-by-side electrical outlets. In this way, the two perimeters 180, 205 can be used to level a pair of side-by-side electrical outlets. Alternatively, as shown in FIG. 6, the level 100 only includes one electrical outlet perimeter 180. The perimeters 180 and 205 can be formed on either side of the web 105.

Figure 8:
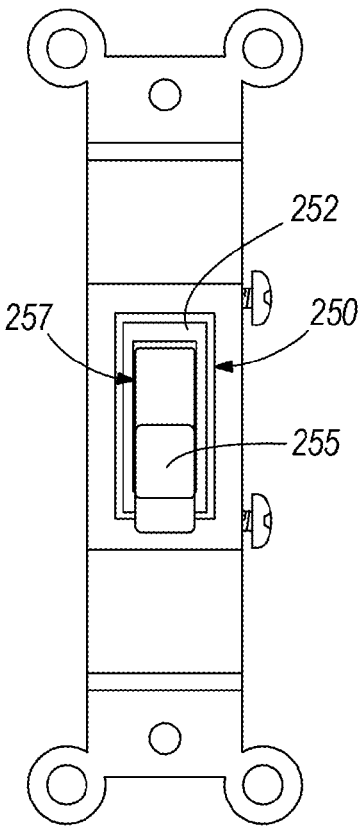
FIG. 8 is a front view of a light switch.

A first light switch aperture 225 is formed through the web 105. The aperture 225 is positioned within the perimeter 180. The aperture 225 forms a third perimeter 230 that includes a top portion 235, a bottom portion 240, and two side portions 245. The perimeter 230 is shaped like the perimeter 250 of a housing 252 of a standard light switch 255, as shown in FIG. 8. The perimeter 230 is sized to engage at least a portion of the perimeter 250 when the housing 252 and the switch 255 are inserted into the aperture 225. When the perimeters 230, 250 are engaged, either the 0-degree vial 150 or the 90-degree vial 155 is used to level the housing 252 and the switch 255. Alternatively, the perimeter 205 is sized to engage the perimeter 257 of the switch 255. In other alternatives, the aperture 225 and the perimeter 230 are configured to accommodate the leveling of different types of switches, for example, slidable dimmer switches.

Figure 9:
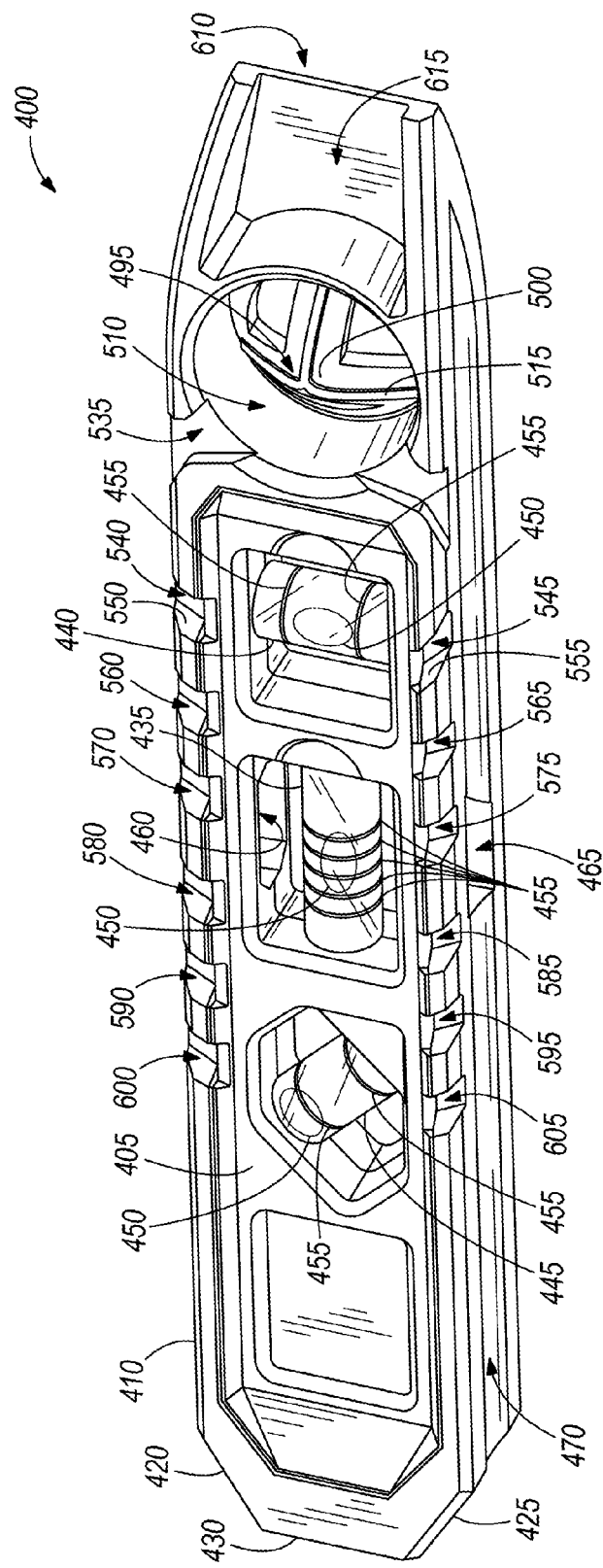
FIG. 9 is perspective view of a level according to another construction of the invention.

A second light switch aperture 260, identical to the first aperture 225, is formed through the web 105. The aperture 260 is positioned within the perimeter 205. The aperture 260 forms a fourth perimeter 265 that includes a top portion 270, a bottom portion 275, and two side portions 280. The second aperture 260 is spaced from the first aperture 225 so that the two apertures 225, 260 are separated by the standard spacing between a pair of side-by-side light switches. In this way, the perimeters 230, 265 of the apertures 225, 260 can be used to level a pair of side-by-side light switches. Alternatively, as shown in FIG. 9, the level 100 only includes one light switch aperture 225.

Figure 5:
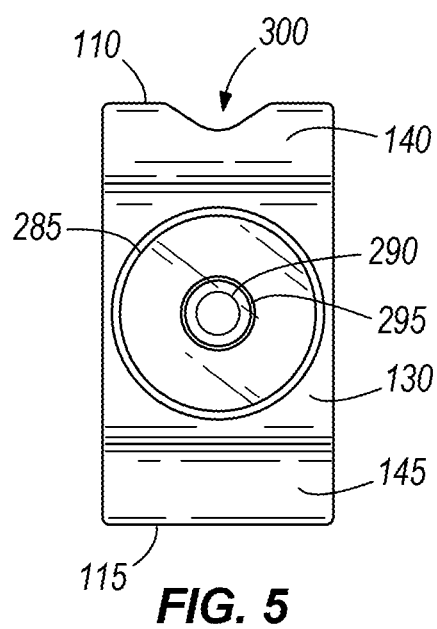
FIG. 5 is a rear view of the level shown in FIG. 1.

As shown in FIGS. 2 and 5, the back planar surface 130 supports a circular or bull's-eye vial 285. The bull's-eye vial 285 contains a liquid, a gas bubble 290, and at least one marking 295, similar to those already described. The bull's eye vial 285 is used to level a surface or object to be leveled in two directions, where the two directions are perpendicular to each other and the two directions are perpendicular to the planar surface engaging the surface or object to be leveled. As the angle of the level 100 (and therefore the angle of the bull's-eye vial 285) changes, the gas bubble 290 moves within the vial towards or away from the center point of the bull's eye vial 285. The surface or object to be leveled is level with respect to the two directions when the gas bubble 290 is centered within the bull's-eye vial 285. The bull's-eye vial 285 is particularly useful for leveling a drain stack. The bull's-eye vial 285 is secured to the back planar surface 130 using arrangements similar to those already discussed and preferably by threaded set screws.

As shown in FIGS. 1 and 2, the top planar surface 110 includes a channel 300 extending along the length of the top planar surface 110. The channel 300 is curved so the top planar surface 110 can engage a tube, pipe, or other rounded surface for leveling. Alternatively, the channel 300 is notched or V-shaped for engaging a rounded surface for leveling. In other alternatives, the top planar surface 110 is flat. The bottom planar surface 115 includes a notch 305 extending into the web 105. The notch 305 is sized to provide clearance for a seam or other protrusion on the surface or object to be leveled. For example, a vent pipe frequently has a seam that makes it difficult to place the bottom planar surface 115 on the vent pipe. The notch 305 allows the bottom planar surface 115 to be used to level the vent pipe by providing clearance between the bottom planar surface 115 and the seam. Alternatively, the bottom planar surface 115 includes a channel 300 similar to the top planar surface 110. When both the top planar surface 110 and the bottom planar surface 115 include a depression, the two depressions can be sized such that each depression accommodates a rounded surface of a different diameter.

As shown in FIGS. 1 and 2, the top planar surface 110 can include magnets 310 that allow the level to be magnetically attached to a surface or object to be leveled. As shown, the magnets 310 are exposed. Alternatively, the magnets 310 are embedded in the top planar surface 110 (i.e., covered and hidden from view). Preferably, the magnets 310 are neodymium magnets; however, other rare earth or non-rare earth magnets can be also be used. Alternatively, the magnets 310 are supported by the web 105 or other surfaces of the level 100.

As shown in FIG. 1, the top planar surface 110 includes three apertures 315, 320, and 325 extending into the web 105. The apertures 315, 320, and 325 allow the user to view the 0-degree vial 150, the 90-degree vial 155, and the 45-degree vial 160, respectively, through the top planar surface 110. The 30-degree planar surface 125 includes an aperture 330 extending into the web 105 that allows the user to view the 30-degree vial 165 through the 30-degree planar surface.

In the illustrated construction, the level 100 has a length of about 9.50 inches, a thickness of about 0.75 inches, and a height of about 1.375 inches. The features of the illustrated construction may be adapted for use in constructions of the level where the level has a greater or a lesser length, width or height. The level 100 can be constructed from aluminum, steel, plastic, or other suitable material. In addition, other features not discussed could be included on the level 100 or some features discussed could be omitted from the level 100.

Figure 10:
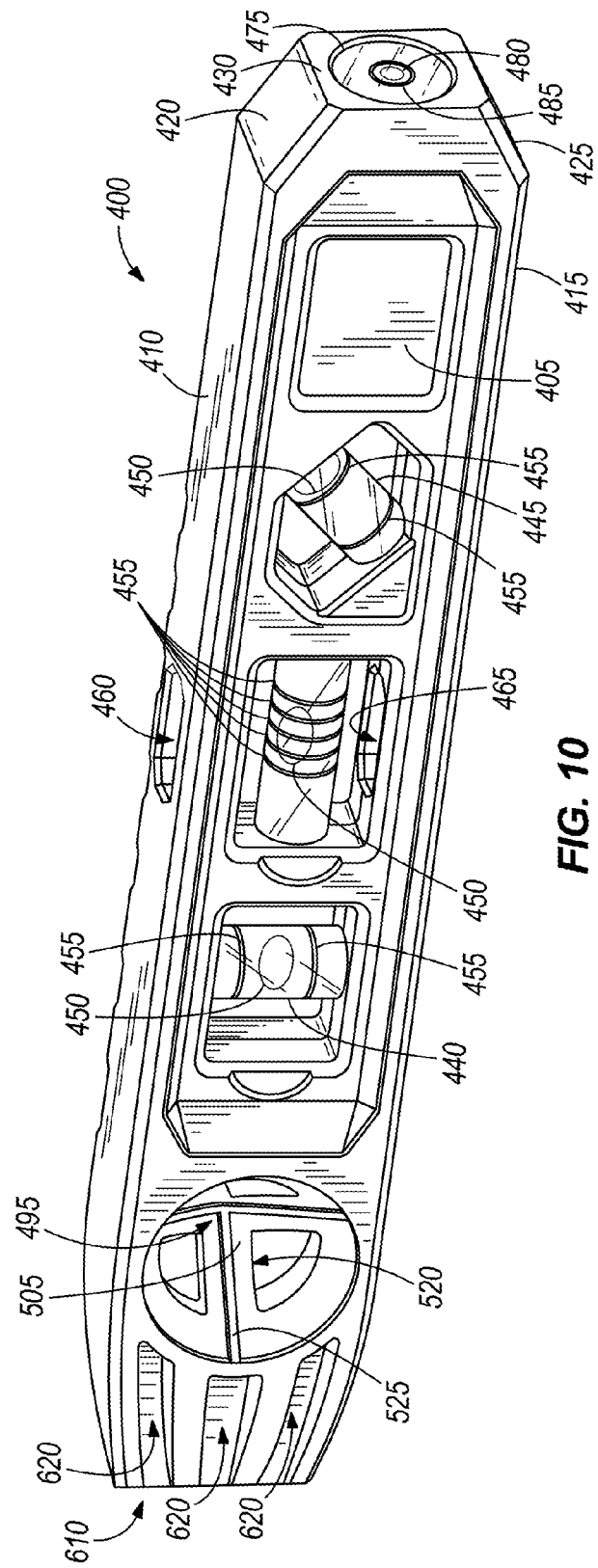
FIG. 10 is another perspective view of the level shown in FIG. 9.

FIGS. 9 and 10 illustrate another construction of a level 400. The level 400 includes many of the same features and characteristics of the level 100 shown in FIGS. 1-5. Reference is made to the description of the level 100 for additional characteristics and variations of the level 400. The following description presents additional characteristics and features of the level 400.

As shown in FIGS. 9 and 10, the level 400 includes a web 405 coupled to each of a top planar surface 410, a bottom planar surface 415, a first 45-degree planar surface 420, a second 45-degree planar surface 425, and a back planar surface 430. The top planar surface 410 is spaced apart from and substantially parallel to the bottom planar surface 415. The first 45-degree planar surface 420 is disposed at an included angle of 135 degrees relative to the top planar surface 410 and the second 45-degree planar surface 425 is disposed at an included angle of 135 degrees relative to the bottom planar surface 415. The back planar surface 430 is substantially perpendicular to the top planar surface 410 and the bottom planar surface 415. The back planar surface 430 is connected to the top planar surface 410 by the first 45-degree planar surface 420 and is connected to the bottom planar surface 415 by the second 45-degree planar surface 425.

The web 405 supports a 0-degree vial 435, a 90-degree vial 440, and a 45-degree vial 445, in much the same way as was described with regard to the construction of FIGS. 1-6. The long axis of the 0-degree vial 435 is parallel with the top planar surface 410 and the bottom planar surface 415. The long axis of the 90-degree vial 440 is parallel with the back planar surface 430. The long axis of the 45-degree vial 440 is parallel with the second 45-degree planar surface 425. Each vial contains a liquid, a gas bubble 450, and a series of markings 455.

In some constructions, the 0-degree vial 435, and/or other vials, is a slope gradient vial 435. The slope gradient vial 435 includes a series of slope markings 455 that indicate one-quarter inch, one-eighth inch, and one-sixteenth inch slopes relative to the top planar surface 410 or the bottom planar surface 415. In other alternatives, an integrated shim is included with the slope gradient vial 435 to adjust the longitudinal axis of the vial 435 to the appropriate slope relative to the top planar surface 410 or the bottom planar surface 415.

As shown in FIG. 10, the top planar surface 410 includes an aperture 460 extending into the web 405. As shown in FIG. 9, the bottom planar surface 415 includes an aperture 465 extending into the web 405. The apertures 460 and 465 allow the user to view the vial 435 through the top planar surface 410 and the bottom planar surface 415, respectively. The bottom planar surface 415 includes a channel 470 extending along the length of the bottom planar surface 415. The channel 470 is curved so the bottom planar surface 415 can engage a tube, pipe, or other rounded surface for leveling. Alternatively, the channel 470 is notched or V-shaped for engaging a rounded surface for leveling.

As shown in FIG. 10, the back planar surface 430 supports a circular or bull's-eye vial 475, similar to the one already discussed. The bull's-eye vial 475 contains a liquid, a gas bubble 480, and at least one marking 485.

As shown in FIGS. 9 and 10, a deburring tool 495 is coupled to or formed as part of the web 405. The deburring tool 495 includes a cylindrical aperture with a conical member disposed near one end and extending towards the opposite end of the cylindrical aperture. The deburring tool 495 includes a male side 500 (FIG. 9) and a female side 505 (FIG. 10). An aperture 510 extends into first side of the web 405 and provides access to the male side 500 of the deburring tool 495. The male side 500 includes at least one cutting surface or blade 515 and is arranged to deburr the inside of a tube (e.g., a pipe). To use the male side 500 to deburr the inside of a tube, the tube is inserted into the aperture 510 so that the end of the tube contacts the male side 500. The tube or level 400 is then twisted about the long axis of the tube while in contact with the male side 500 so that the blade 515 cuts away any burrs found on the inside of the tube. An aperture 520 extends into the second side of the web 405 and provides access to the female side 505 of the deburring tool 495. The female side 505 includes at least one cutting surface or blade 525 and is arranged to deburr the outside of a tube. To use the female side 505 to deburr the outside of a tube, the tube is inserted into the aperture 520 so that the end of the tube contacts the female side 505. The tube or level 400 is then twisted about the long axis of the tube while in contact with the female side 505 so that the blade 525 cuts away any burrs found on the outside of the tube. The conical shape of the deburring tool 495 allows both sides 500 and 505 of the deburring tool to be used on tubes of differing diameters. Preferably, the deburring tool 495 is sized to accommodate pipe up to one-inch in diameter, with larger or smaller sizes being possible. The deburring tool 495 is suitable for use with metal pipe or plastic pipe.

As shown in FIG. 9, a chamfering tool 530 is formed by a slot 535 and at least one pair of grooves 540 and 545. The slot 535 extends across the web 405 and through the top planar surface 410 and the bottom planar surface 415. The first pair of grooves includes a first groove 540 through the top planar surface 410 and a second groove 545 through the bottom planar surface 415. The first groove 540 forms a first cutting face 550 and the second groove 545 forms a second cutting face 555. The pair of grooves 540 and 545 is spaced a set distance apart from the slot 535. The set distance corresponds to the diameter of a tube to be chamfered. The slot 535 and the pair of grooves 540 and 545 cooperate to chamfer the end of the tube. The end of the tube is inserted into the slot 535 and the first pair of grooves 540 and 545. The tube or level 400 is then twisted about the long axis of the tube so that the cutting faces 550 and 555 cut a chamfer into the end of the tube. Additional pairs of grooves 560 and 565, 570 and 575, 580 and 585, 590 and 595, 600 and 605, similar to the first pair of grooves 540 and 545, are provided to allow the user to chamfer tubes of different diameters. Preferably, tubes of up to four inches in diameter can be chamfered. A pair of grooves and the corresponding cutting faces can be configured to create an inside chamfer, an outside chamfer, or both on the end of a tube.

A shovel 610 is formed in the web 405 by a depression 615 formed in a first side of the web 405 (FIG. 9) and three slots 620 formed in a second side of the web 405 (FIG. 10). The shovel 610 can be used to dig or clear debris from a work area as required.

Figure 11:
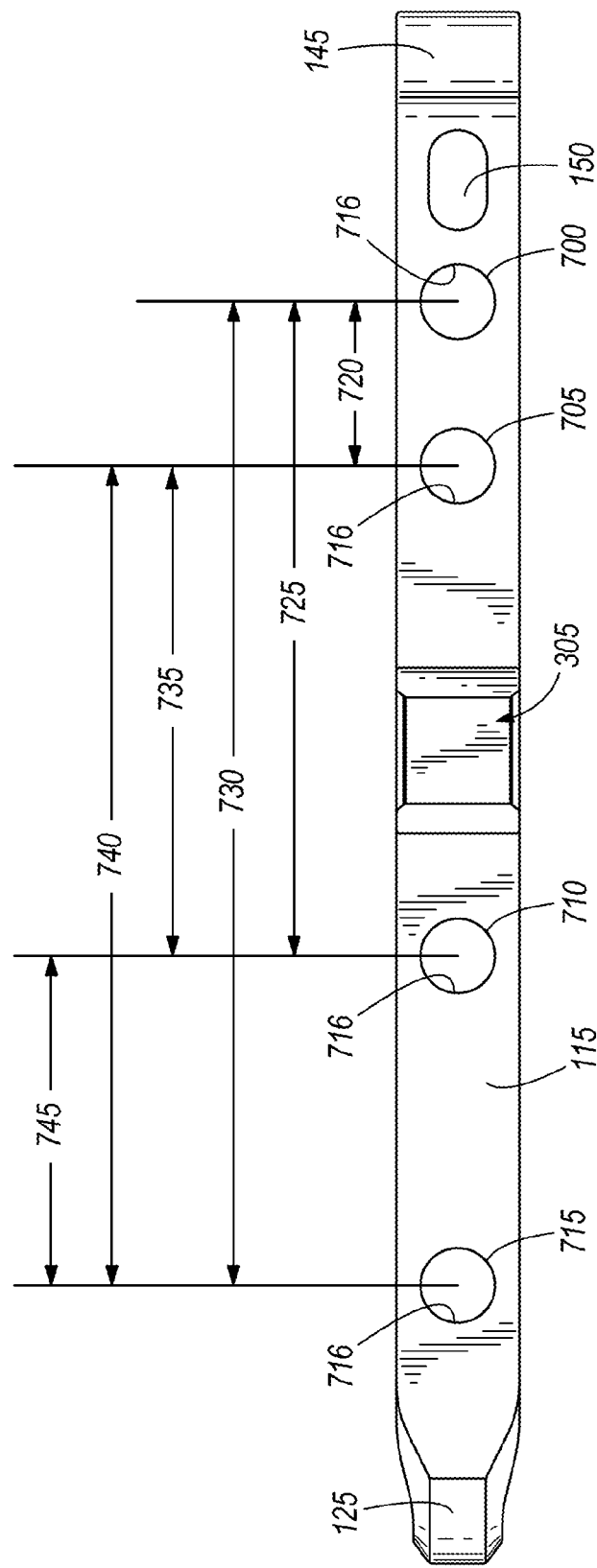
FIG. 11 is a bottom view of the level of FIG. 1.
Figure 12:
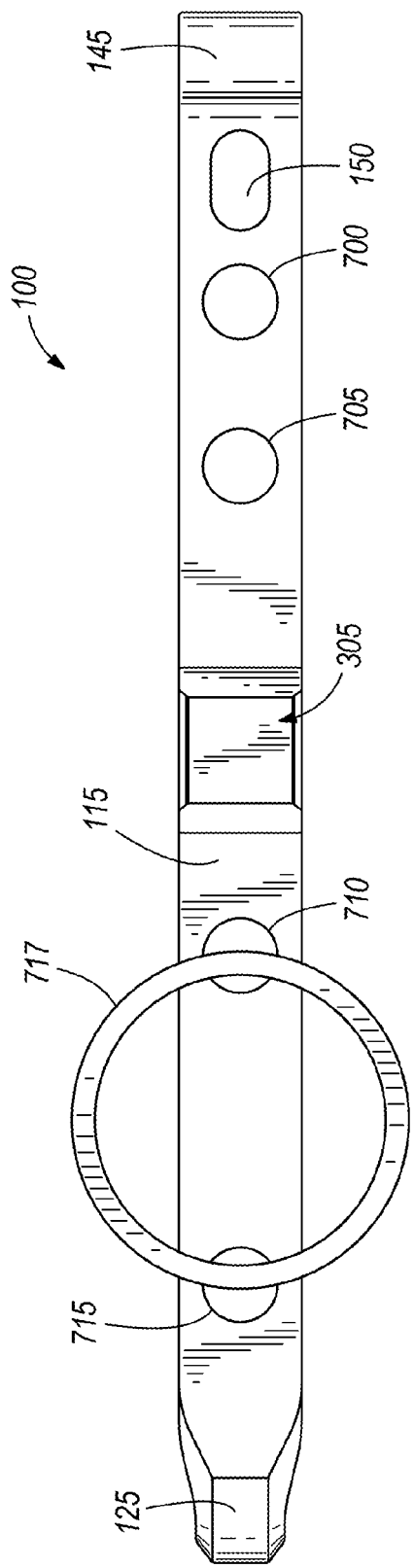
FIG. 12 is a bottom view of the level of FIG. 1, with the level magnetically connected to a pipe.

FIGS. 11 and 12 further illustrate the level 100 of FIGS. 1-6. As shown in FIG. 11, the level 100 includes four magnets 700, 705, 710, 715 coupled to the bottom planar surface 115. Each of the magnets 700, 705, 710, 715 is positioned within a corresponding opening 716 formed in the bottom planar surface 115 such that the magnets 700, 705, 710, 715 do not extend beyond the planar surface 115. In some embodiments, the magnets 700, 705, 710, 715 may be recessed relative to the planar surface 115. In other embodiments, the magnets 700, 705, 710, 715 may be flush with the planar surface 115.

The illustrated magnets 700, 705, 710, 715 are positioned along the bottom planar surface 115 in order such that the magnets 700, 705, 710, 715 successively follow each other from the first magnet 700 at one end of the level 100 to the fourth magnet 715 at an opposite end of the level 100. The first magnet 700 and the second magnet 705 are positioned rearward of the notch 305, with the first magnet 700 being positioned closer to the rear of the level 100 (illustrated as the second connecting surface 145). The third magnet 710 and the fourth magnet 715 are positioned forward of the notch 305, with the fourth magnet 715 being positioned closer to the front of the level 100 (illustrated as the 30-degree planar surface 125).

The magnets 700, 705, 710, 715 are spaced apart along the length of the bottom planar surface 115. The first magnet 700 is spaced apart from the second magnet 705 by a first distance 720, from the third magnet 710 by a second distance 725, and from the fourth magnet 715 by a third distance 730. The second magnet 705 is spaced apart from the third magnet 710 by a fourth distance 735 and from the fourth magnet 715 by a fifth distance 740. The third magnet 710 is spaced apart from the fourth magnet 715 by a sixth distance 745. Each of the distances 720, 725, 730, 735, 740, 745 is measured between the center points of the two associated magnets 700, 705, 710, 715. In the illustrated embodiment, the first distance 720 is about one inch (about 2.54 centimeters), the second distance 725 is about four inches (about 10.16 centimeters), the third distance 730 is about six inches (about 15.24 centimeters), the fourth distance 735 is about three inches (about 7.62 centimeters), the fifth distance 740 is about five inches (about 12.7 centimeters), and the sixth distance 745 is about two inches (about 5.08 centimeters). As used herein wherein referring to a distance, the term "about" means within ⅛ (0.125) inches or 0.3175 centimeters.

The magnets 700, 705, 710, 715 are used to releasably magnetically connect the level 100 to an object. For example, the magnets 700, 705, 710, 715 can be used to magnetically connect the level 100 to an end of a pipe, such as black pipe, galvanized pipe, electrical conduit, electrical metallic tubing (EMT), or the like. The magnets 700, 705, 710, 715 are spaced apart from one another such that two of the four magnets contact the end of the pipe at opposite sides along a diameter of the pipe. By using different combinations of the magnets 700, 705, 710, 715, the level 100 can magnetically connect to pipes of different diameters. In the illustrated embodiment, the level 100 may be magnetically connected to pipes varying in diameter between about one inch (about 2.54 centimeters) and about six inches (about 15.24 centimeters). The illustrated magnets 700, 705, 710, 715 are positioned such that the level 100 can couple to pipes having diameters that are one inch increments within this range (e.g., a two inch pipe, a three inch pipe, a four inch pipe, and a five inch pipe).

As shown in FIG. 12, a pipe 717 is magnetically connected to the third and fourth magnets 710, 715. Typically, the dimensions used to indicate pipe diameters are whole numbers measured in inches. The actual outer diameter of a pipe, however, is larger than the nominal pipe diameter, and the inner diameter of the pipe varies based on wall thickness of the pipe. For example, a six inch diameter black pipe has an outer diameter of 6.625 inches and an inner diameter that can vary between 4.897 inches and 6.407 inches, depending on wall thickness.

In the illustrated embodiment, the magnets 700, 705, 710, 715 are generally cylindrical such that they have generally circular cross-sections. In other embodiments, the magnets 700, 705, 710, 715 could have different cross-sectional shapes (e.g., ovals, rectangles, polygons, etc.) to further increase the range of pipes that the magnets 700, 705, 710, 715 can engage. Additionally or alternatively, the magnets 700, 705, 710, 715 could be spaced apart at different distances to accommodate magnetically connecting the level 100 to pipes of different diameters. Furthermore, the bottom planar surface 115 could include additional magnets to increase the number of pipe diameters to which the level 100 can be magnetically connected. In some embodiments, the level 100 may include only three magnets, which results in fewer pipe diameters to which the level 100 could be magnetically connected. Furthermore, the magnets 700, 705, 710, 715 could be coupled to the top planar surface 110.

Figure 13:
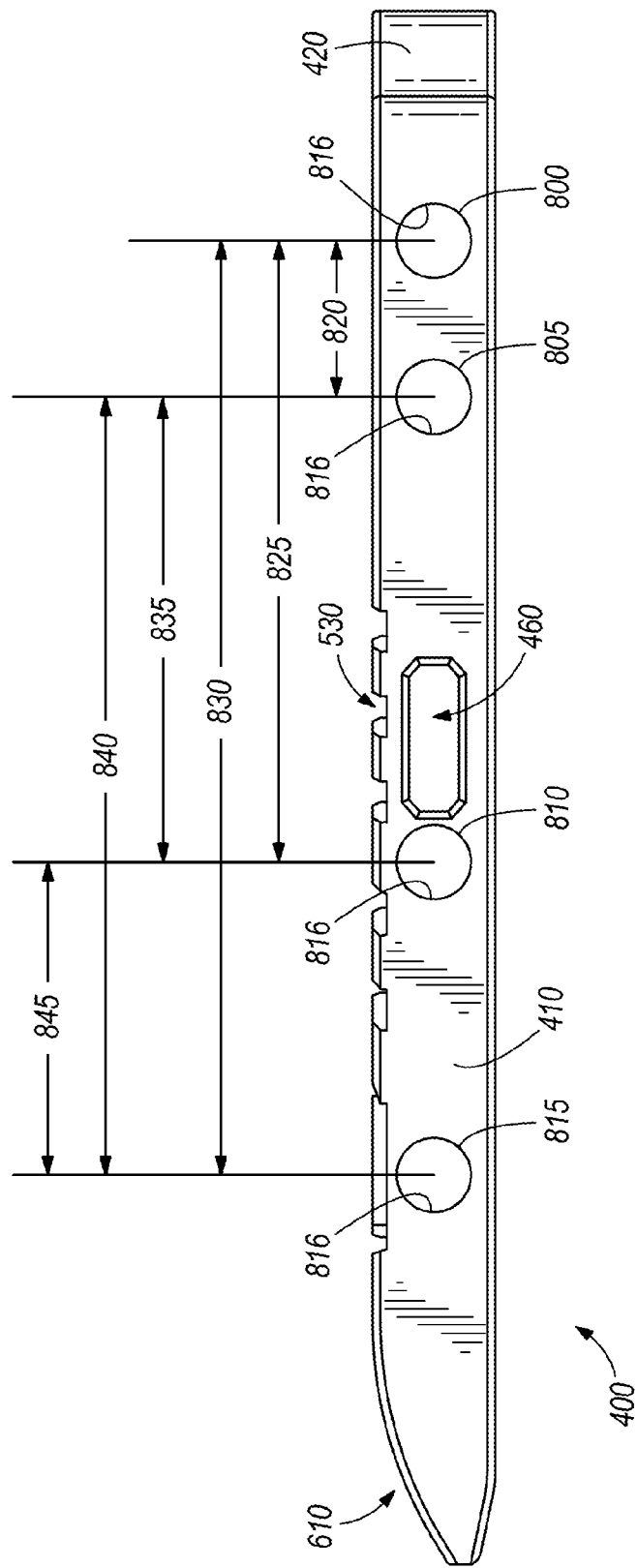
FIG. 13 is a top view of the level of FIG. 9.

FIG. 13 further illustrates the level 400 of FIGS. 9-10. The level 400 includes four magnets 800, 805, 810, 815 coupled to the upper planar surface 410. The illustrated magnets 800, 805, 810, 815 are generally arranged on the level 400 in a similar manner to the magnets 700, 705, 710, 715 discussed above and are used to releasably magnetically connect the level 400 to an object, such as an end of a pipe. Each of the magnets 800, 805, 810, 815 is positioned within a corresponding opening 816 formed in the upper planar surface 410 such that the magnets 800, 805, 810, 815 do not extend beyond the planar surface 410.

In the illustrated embodiment, the first magnet 800 and the second magnet 805 are positioned rearward of the aperture 460, with the first magnet 800 being positioned closer to the rear of the level 400 (illustrated as the first 45-degree planar surface 420). The third magnet 810 and the fourth magnet 815 are positioned forward of the aperture 460, with the fourth magnet 815 being positioned closer to the front of the level 400 (illustrated as the shovel 610).

Similar to the magnets 700, 705, 710, 715 discussed above, the first magnet 800 is spaced apart from the second magnet 805 by a first distance 820, from the third magnet 810 by a second distance 825, and from the fourth magnet 815 by a third distance 830. The second magnet 805 is spaced apart from the third magnet 810 by a fourth distance 835 and from the fourth magnet 815 by a fifth distance 840. The third magnet 810 is spaced apart from the fourth magnet 815 by a sixth distance 845. Each of the distances 820, 825, 830, 835, 840, 845 is measured between the center points of the two associated magnets 800, 805, 810, 815. In the illustrated embodiment, the first distance 820 is about one inch (about 2.54 centimeters), the second distance 825 is about four inches (about 10.16 centimeters), the third distance 830 is about six inches (about 15.24 centimeters), the fourth distance 835 is about three inches (about 7.62 centimeters), the fifth distance 840 is about five inches (about 12.7 centimeters), and the sixth distance 845 is about two inches (about 5.08 centimeters). In other embodiments, the distances 820, 825, 830, 835, 840, 845 may be relatively longer or shorter.

Although the invention has been described in detail with reference to certain preferred embodiments, variations and modifications exist within the scope and spirit of one or more independent aspects of the invention as described.

Various features and advantages of the invention are set forth in the following claims.

The invention claimed is:

1. A level for indicating the orientation of a surface, the level comprising:
   a first planar surface;
   a second planar surface;
   a web coupled to the first planar surface and the second planar surface such that the first planar surface is spaced apart from and is parallel to the second planar surface;
   a vial having a long axis and containing a liquid and a gas bubble, the vial coupled to the web;

a first magnet coupled to the first planar surface;
a second magnet coupled to the first planar surface and spaced apart from the first magnet by a first distance; and
a third magnet coupled to the first planar surface and spaced apart from the second magnet by a second distance that is different than the first distance;
wherein the first, second, and third magnets are positioned along the first planar surface successively without any additional magnets positioned therebetween.

2. The level of claim 1, wherein the second distance is at least twice as long as the first distance.

3. The level of claim 2, wherein the second distance is three times as long as the first distance.

4. The level of claim 1, wherein the second distance is at least about one inch longer than the first distance.

5. The level of claim 4, wherein the second distance is about two inches longer than the first distance.

6. The level of claim 5, wherein the first distance is about one inch and the second distance is about three inches.

7. The level of claim 1, further comprising a fourth magnet coupled to the first planar surface and spaced apart from the third magnet by a third distance that is different than at least one of the first distance and the second distance, wherein the fourth magnet is positioned along the first planar surface successively with the first, second, and third magnets without any additional magnets positioned therebetween.

8. The level of claim 7, wherein the third distance is longer than the first distance, and wherein the second distance is longer than the third distance.

9. The level of claim 8, wherein the first distance is about one inch, the second distance is about three inches, and the third distance is about two inches.

10. The level of claim 1, wherein the first planar surface defines a first opening, a second opening, and a third opening, and wherein the first magnet, the second magnet, and the third magnet are positioned in the first opening, the second opening, and the third opening, respectively.

11. The level of claim 10, wherein each magnet does not extend beyond the first planar surface.

12. The level of claim 1, wherein each magnet is generally cylindrical.

13. The level of claim 1, wherein the long axis of the vial is one of substantially parallel to and substantially perpendicular to the first planar surface.

14. The level of claim 13, wherein the vial is a first vial, and further comprising a second vial having a long axis and containing a liquid and a gas, wherein the long axis of the first vial is substantially parallel to the first planar surface and the long axis of the second vial is substantially perpendicular to the first planar surface.

15. A level for indicating the orientation of a surface, the level comprising:
a first planar surface;
a second planar surface;
a web coupled to the first planar surface and the second planar surface such that the first planar surface is spaced apart from and is parallel to the second planar surface;
a vial having a long axis and containing a liquid and a gas bubble, the vial coupled to the web;
a first magnet coupled to the first planar surface;
a second magnet coupled to the first planar surface and spaced apart from the first magnet by a first distance;
a third magnet coupled to the first planar surface and spaced apart from the second magnet by a second distance that is different than the first distance; and
a fourth magnet coupled to the first planar surface and spaced apart from the third magnet by a third distance that is different than both the first distance and the second distance.

16. The level of claim 15, wherein the third distance is longer than the first distance, and wherein the second distance is longer than the third distance.

17. The level of claim 16, wherein the third distance is about twice as long as the first distance, and wherein the second distance is about three times as long as the first distance.

18. The level of claim 16, wherein the third distance is about one inch longer than the first distance, and wherein the second distance is about one inch longer than the third distance.

19. The level of claim 16, wherein the first distance is about one inch, the second distance is about three inches, and the third distance is about two inches.

20. The level of claim 15, wherein the first, second, third, and fourth magnets are positioned along the first planar surface successively without any additional magnets positioned therebetween.

* * * * *